(12) United States Patent
Chosnek et al.

(10) Patent No.: US 6,599,348 B2
(45) Date of Patent: Jul. 29, 2003

(54) METHODS FOR REDUCING ENTRAINMENT OF SOLIDS AND LIQUIDS

(75) Inventors: Jack Chosnek, League City, TX (US); David William Ford, Houston, TX (US); Michael B. Lakin, Corpus Christi, TX (US)

(73) Assignee: Celanese International Corporation, Dallas, TX (US)

( * ) Notice: Subject to any disclaimer, the term of this patent is extended or adjusted under 35 U.S.C. 154(b) by 21 days.

(21) Appl. No.: 09/872,739

(22) Filed: Jun. 1, 2001

(65) Prior Publication Data

US 2002/0189453 A1 Dec. 19, 2002

(51) Int. Cl.$^7$ ................................................ B01D 45/12
(52) U.S. Cl. .......................... 95/271; 55/416; 55/419; 55/424; 55/459.1; 55/459.5
(58) Field of Search ........................... 95/271; 55/459.1, 55/419, 418, 416, 424, 426, 459.5

(56) References Cited

U.S. PATENT DOCUMENTS

| | | | | |
|---|---|---|---|---|
| 1,344,146 A | * | 6/1920 | Peck | .......................... 209/143 |
| 2,860,955 A | * | 11/1958 | Kassel | .......................... 422/220 |
| 4,163,701 A | | 8/1979 | Schepacz | ..................... 204/129 |
| 4,166,773 A | | 9/1979 | Higley et al. | .................. 203/72 |
| 4,247,486 A | | 1/1981 | Brewester et al. | ........... 568/454 |
| 4,287,369 A | | 9/1981 | Harris et al. | ................. 568/454 |
| 4,871,879 A | | 10/1989 | Laird | ........................... 568/454 |
| 5,672,743 A | | 9/1997 | Garland et al. | ............. 562/519 |
| 5,743,926 A | | 4/1998 | Bannon et al. | ................ 55/396 |
| 5,873,469 A | * | 2/1999 | Stone | ........................... 209/22 |
| 5,932,764 A | | 8/1999 | Morris et al. | ................ 562/519 |
| 6,153,792 A | | 11/2000 | Leet et al. | ................... 562/519 |

* cited by examiner

Primary Examiner—Robert A. Hopkins
(74) Attorney, Agent, or Firm—M. Susan Spiering

(57) ABSTRACT

Methods are provided for the reduction in entrainment of solids and liquids, and loss of valuable chemicals such as catalysts, in processing and refining sequences that employ separation devices in which non-vapors are to be separated from vapors. The methods comprise regulating the velocities of the incoming stream and the vapor being separated, and creating and maintaining the flow of the incoming stream tangentially to the inner surface of the separation vessel, so as to aid in the reduction in entrainment and loss of valuable chemicals.

39 Claims, 4 Drawing Sheets

METHODS FOR REDUCING ENTRAINMENT OF SOLIDS AND LIQUIDS

BACKGROUND

1. Field of the Invention

The present invention is directed to processing sequences, refining sequences, and power-generation industries that employ separation devices in which non-vapors and vapors are to be separated. More particularly, the present invention is directed to cyclone/vortex methods for the separation of non-vapor and vapor components in distillation/flashing processes, and processes that benefit from a reduction of entrainment of liquids and solids in the vapor. Still further, the present invention is directed to processes for the reduction of catalyst loss during the separation of non-vapors and vapors.

2. Description of Related Art

In many distillation/flashing processes with mixed phase feed, entrainment of liquid droplets in the vapor rising from the feed zone is undesirable in terms of both economics and product purity. Problems concerning the entrainment of liquid materials in vacuum flasher units are well recognized in the art as represented by U.S. Pat. No. 5,743,926 to Bannon et al. As noted in Bannon et al., trays may be placed directly above the feed zone to remove entrained droplets from vapor in hydrocarbon processing and refining. Bannon et al. further note that a disentrainment or wash-oil section may be incorporated in refineries to reduce entrainment problems by knocking liquid droplets out of a vapor stream as it proceeds to the vapor outlet of a vacuum flasher. Despite the methods claimed by Bannon et al., however, methods for reducing entrainment that are both effective and efficient from a costs stand-point remain lacking in industry.

Another problem in terms of both economics and product purity is the entrainment in the vapor overhead of dissolved or suspended solids, such as catalyst(s). Entrained solids can be detrimental to product purity, or can foul downstream equipment. In addition, entrained solids can translate into a loss of a valuable chemical, such as a catalyst. In this regard, U.S. Pat. No. 6,153,792 to Leet et al. discloses a process for the production of a carboxylic acid in the presence of solid catalyst particles that employs a flash step, using trays and a liquid wash. The liquid wash step disclosed by Leet et al. generally "washes" attrited catalyst particles in upward flowing vapors, downward in the flasher. U.S. Pat. No. 4,247,486 to Brewster et al. and U.S. Pat. No. 4,287,369 to Harris et al. mention the loss of rhodium catalyst by entrainment in reactor overhead, and disclose the use of demisting pads to remove entrained liquid droplets for return to the reactor. Despite the methods claimed by Leet et al., Brewster et al., and Harris et al., methods for reducing entrainment of dissolved or suspended solids and loss of valuable chemicals such as catalysts that are both effective and efficient from a costs stand-point remain lacking in industry.

Reducing the amount of catalyst lost through entrainment has been a concern in a wide variety of industries, as represented by U.S. Pat. No. 4,166,773 to Higley et al.; U.S. Pat. No. 4,163,701 to Strong; and U.S. Pat. No. 4,871,879 to Laird. None of these methods, however, have fulfilled the needs in industry.

The method of the present invention fulfills multiple needs in industry: (1) a reduction of entrainment of liquids, and dissolved or suspended solids, in a separated vapor; (2) a reduction in the amount of valuable chemicals lost, as a result of the reduction of entrainment; (3) making it possible to use a smaller and less expensive separation vessel to reduce entrainment where before only a larger and more expensive vessel could be used for the same purpose; and (4) making it possible to retrofit existing separation vessels so as to achieve the reduction in entrainment without the need to build an entirely new vessel.

SUMMARY OF THE INVENTION

According to the present invention, methods are provided for reducing entrainment of solids and liquids, collectively referred to as "non-vapor", in a vapor flow exiting a separation vessel. According to preferred methods of the present invention, one or more of the following steps may be performed to reduce the entrainment of non-vapor in a vapor flow exiting a separation vessel: (1) minimizing the climbing or creeping of the stream toward the vapor outlet along the inner surface of the separation vessel from the point of introduction of the stream; (2) reducing the amount of non-vapor, if any, that exits from the separation vessel through the vapor outlet; and (3) maximizing the flow of the stream tangentially to the inner surface of the separation vessel, hereinafter referred to as "tangential coherency."

The methods of the invention comprise introducing a stream into a separation vessel having an inner surface, at least one inlet, and at least one vapor outlet. The stream can be any mixture of vapor and non-vapor. The term "vapor" as used herein shall mean vapor and/or gas. The term "non-vapor" as used herein shall mean liquids, solids such as catalysts, and mixtures of liquids and solids, including solutions and suspensions. According to the methods of the invention, the stream contains at least one non-vapor and at least one vapor. The stream is introduced to the separation vessel through the inlet(s), where the velocity of the stream is reduced upon introduction into the separation vessel, and where the tangential coherency of the stream is maximized. Reducing the velocity of the incoming stream and maximizing its tangential coherency contributes to the minimization of the tendency of the stream to move along the inner surface of the separation vessel toward the vapor outlet and contributes to a reduction in entrainment.

According to the method of the present invention, a vapor flow is separated from the stream in the separation vessel, and rises within the separation vessel at non-uniform vapor velocities. The vapor flow exits the separation vessel through the vapor outlet(s), moving at vapor flow exit velocities. According to a preferred embodiment of the present invention, the non-uniform velocities at which the vapor flow flows within the separation vessel may be distributed to aid in reduction of entrainment of non-vapor and loss of valuable non-vapor components such as catalysts. The distribution of vapor velocities contributes to a reduction in the tendency of the stream to move along the inner surface of the separation vessel toward the vapor outlet, and also minimizes the vortex capabilities of the rising vapor flow, thereby reducing entrainment of non-vapor.

According to further preferred embodiments of the present invention, the stream is guided along a path when it is introduced to the separation vessel such that tangential coherency is maximized, such that the tendency of the stream to move along the inner surface of the separation vessel toward the vapor outlet is minimized, and such that the amount of non-vapor that exits with the vapor flow through the vapor outlet(s) is minimized.

Still further preferred embodiments of the present invention for reducing entrainment of non-vapor and loss of valuable non-vapor include controlling the vapor flow exit velocities such that the tangential coherency of the stream is maintained, such that the tendency of the stream to move along the inner surface of the separation vessel toward the vapor outlet is minimized, and such that the amount of non-vapor that exits the separation vessel with the vapor flow through the vapor outlet(s) is minimized.

According to still further preferred embodiments of the present invention, a cyclone, as known in the industry, can also be used in combination with other embodiments of the present invention to recover any of the non-vapor that exits the separation vessel with the vapor flow.

The methods of the present invention are more fully explained in the following detailed discussion and examples.

DETAILED DESCRIPTION

Figure 1:
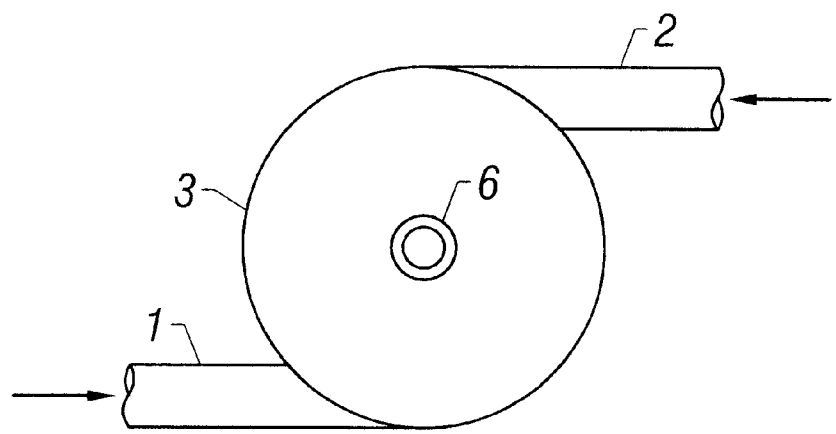
FIG. 1 is a top view of a separation vessel having two inlets.
Figure 2:
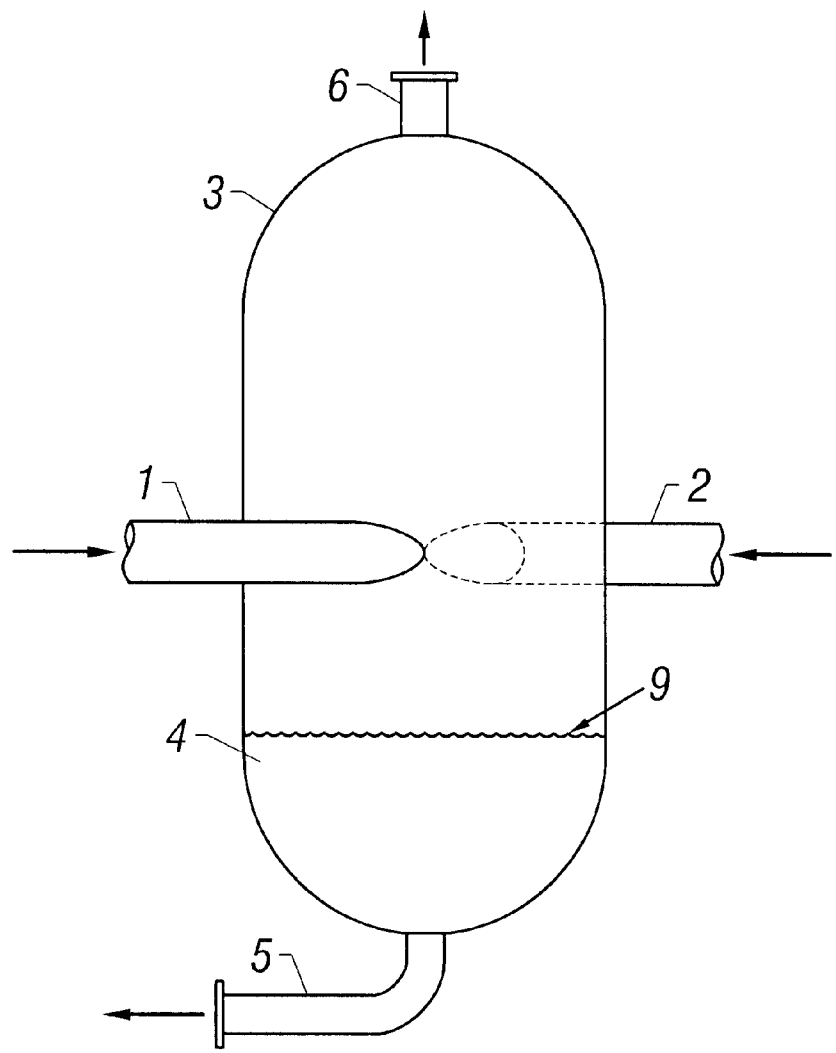
FIG. 2 is a front view of a separation vessel having two inlets.

Referring now to the drawings, and to FIG. 1 in particular, a separation vessel (3), with dual inlets (1) and (2) is illustrated. FIG. 2 shows a front view of a separation vessel (3) with dual inlets (1) and (2), a vapor outlet (6), a base (4), and an outlet (5).

A stream is introduced into the separation vessel (3) through inlets (1) and (2). The number of inlet(s) used, the location of the inlet(s), and the diameter of the inlet(s) can be manipulated, as dictated by the geometry of the separation vessel, so as to reduce the velocity of the stream upon introduction into the separation vessel, so as to reduce the tendency of the stream to move along the inner surface of the separation vessel toward the vapor outlet, and to reduce entrainment of non-vapors.

Figure 6:
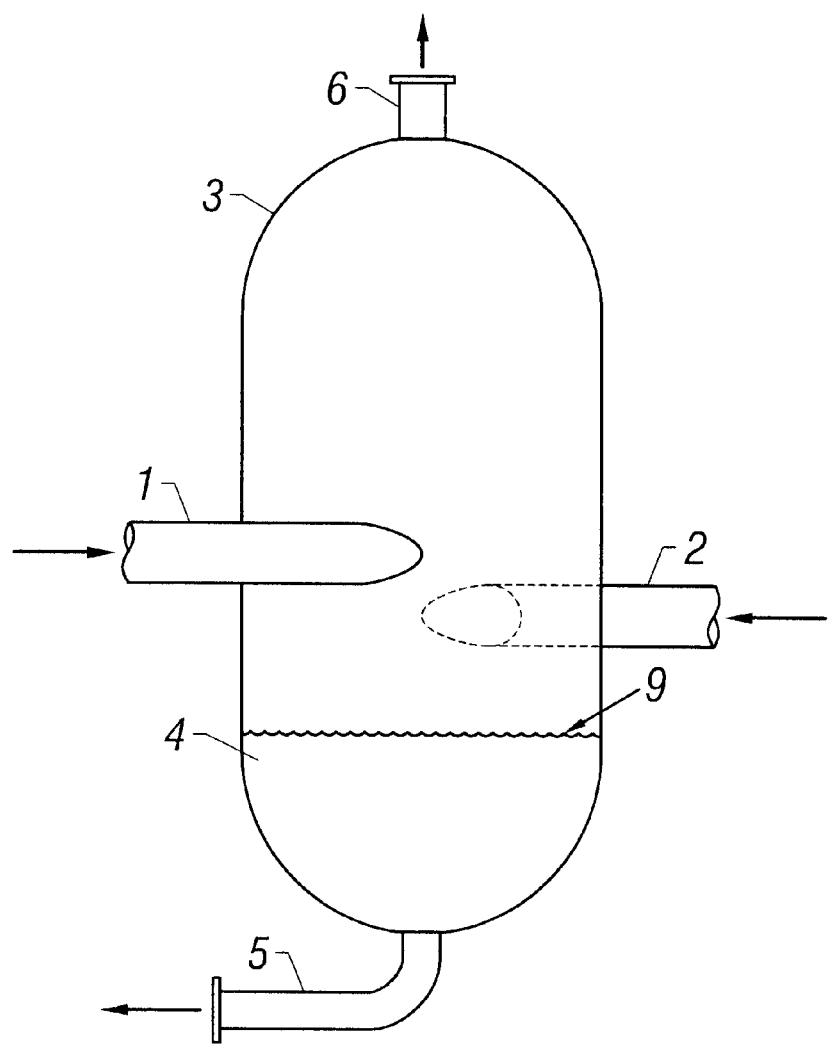
FIG. 6 is a front view of an alternate embodiment of a separation vessel having two inlets.

The diameter of the inlet(s) (1) and/or (2) preferably is such that tangential coherency of the incoming stream is maximized. Although the inlets (1) and (2) are shown in FIG. 2 as having a cylindrical geometry, those of ordinary skill in the art will recognize that inlets having other than a cylindrical geometry may also be used. Accordingly, a wide variety of geometries can be used to design the inlet(s). According to an alternate embodiment of the present invention, as illustrated in FIG. 6, the location of the inlets (1) and (2) can be varied so that the point of entry of inlet (1) is vertically displaced from the point of entry of inlet (2). Those of ordinary skill in the art will recognize that the vertical displacement between inlets (1) and (2) can be widely varied, as dictated by the geometry of the separation vessel, so as to reduce the velocity and maximize the tangential coherency of the incoming stream, thereby achieving a reduction in entrainment.

Figure 7:
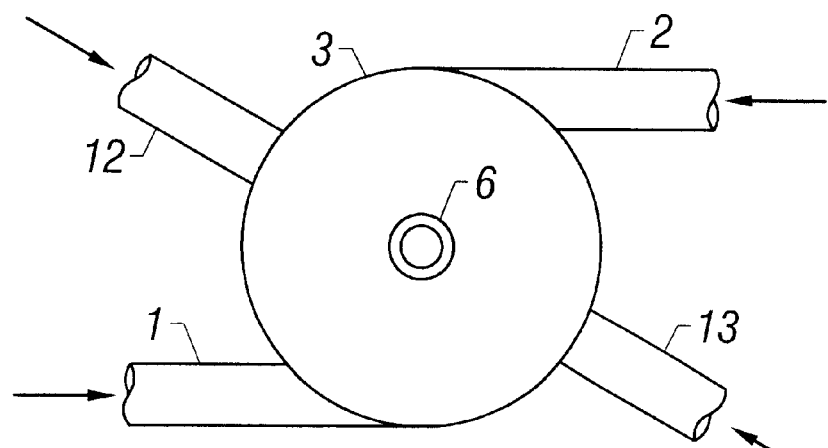
FIG. 7 is a top view of an alternate embodiment of a separation vessel having a plurality of inlets.

According to another alternate embodiment of the present invention, as illustrated in FIG. 7, a plurality of inlets (1), (2), (12), and (13) can be used to reduce the velocity and maximize the tangential coherency of the incoming stream. As illustrated in FIG. 7, inlets (1) and (2) provide a tangential entry into the separation vessel (3), while inlets (12) and (13) provide a perpendicular entry. Those of ordinary skill in the art will recognize that locations of inlets (1), (2), (12), and (13) are illustrative in nature, and that the inlets can be positioned anywhere along the outer perimeter of the separation vessel. Those of ordinary skill in the art will also recognize that the number of inlets used can be widely varied, as dictated by the geometry of the separation vessel, and by the benefits from a cost-standpoint.

The ratio of non-vapor to vapor in the input stream preferably is such that the non-vapor is not so dispersed in the vapor that an accelerating force needs to be applied to the stream to form an agglomeration of the non-vapor. In another preferred embodiment, the velocity of the stream is reduced to a rate that does not cause the stream to break up when it contacts the wall of the separation vessel (3). It is preferred that, upon introduction into the separation vessel, the velocity of the stream is reduced to a rate that is less than the rate at which the breakup of the particles of non-vapor in the stream leads to entrainment of such non-vapor.

Figure 3:
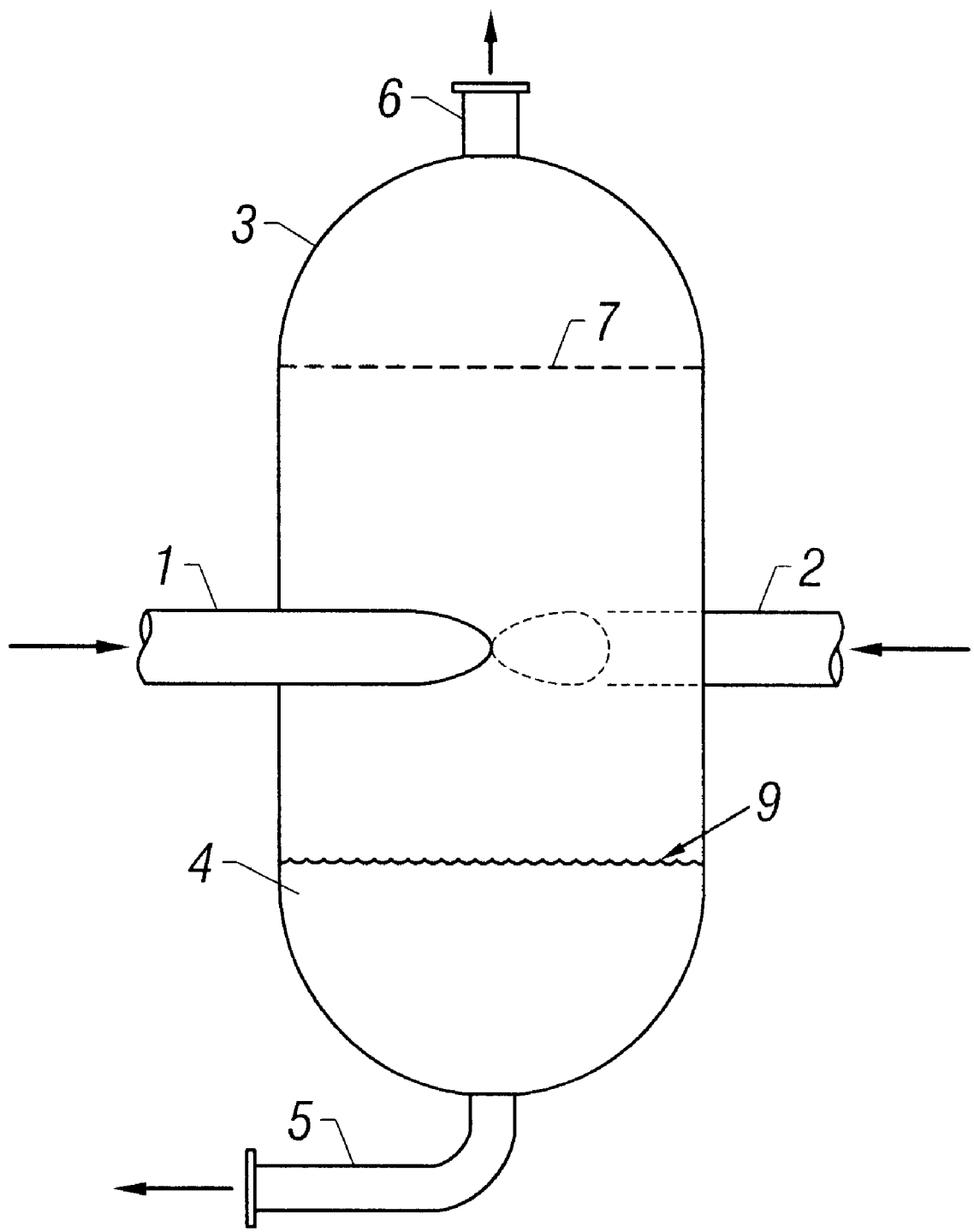
FIG. 3 is a front view of a separation vessel having two inlets and a distribution tray.

Vapor separates from the stream and exits the separation vessel (3) through vapor outlet (6) at non-uniform vapor velocities that are dictated by the design of the separation vessel. Vapor can be separated from the stream by a reduction in pressure upon entry into the separation vessel, or by other methods known to those of ordinary skill in the art. To reduce and distribute the non-uniform vapor velocities within the separation vessel (3), a distribution tray (7) preferably is disposed within the separation vessel, as illustrated in FIG. 3. According to a preferred embodiment of the present invention, the distribution tray is a substantially planar sieve tray. Such a tray is well known to those of ordinary skill in the art. Those of ordinary skill in the art will also recognize that trays that are not planar or substantially planar may also be used.

The distribution tray (7) distributes the non-uniform velocity of the vapor within the separation vessel. The distribution tray (7), however, does not go so far as to equalize the non-uniform velocities because there will be local areas of different velocity at the perforated and solid portions of the distribution tray (7). The distribution of the non-uniform vapor velocities contributes to the reduction of entrainment because higher vapor velocities tend to carry more non-vapor than do lower vapor velocities. The distribution tray (7) also contributes to minimizing the tendency of the stream to move along the inner surface of the separation vessel (3) toward the vapor outlet (6).

According to the methods of the present invention, when a tray (7) is used, it is disposed within the separation vessel (3) and the velocity of the stream is maintained so that the stream does not contact or flood the tray (7). Preferably, the distance between the inlets (1) and (2) and the tray (7) is maximized while maintaining the distribution capabilities of the tray (7).

In another preferred embodiment, the tray (7) is located at a point that minimizes the vortex capability of the vapor, and causes the vapor to travel upwardly within the separation vessel (3). In still another preferred embodiment of the present invention, an irrigating stream of water, liquid, or other irrigating stream is provided to the tray (7) to help reduce entrainment of non-vapor.

As the vapor is separated from the incoming stream, non-vapor within the separation vessel (3) collects in the base (4) where it is maintained at a level (9) by controlling its release through the outlet (5). Those of ordinary skill in the art will recognize that a wide variety of methods can be used to release the non-vapor through the outlet (5), and that the level (9) maintained can be varied as dictated by the geometry of the separation vessel. Although the separation vessel (3) is shown as having a simple cylindrical design, those of ordinary skill in the art will recognize that vessels having other geometrical configurations may be used. Accordingly, a wide variety of geometries can be used to design the separation vessel, including but not limited to, a tapering or widening of the base (4) with respect to the rest of the separation vessel (3). The level (9) in the base (4) of the separation vessel (3) preferably is maintained at a height that will provide for controlled release of the non-vapor from the separation vessel (3), and that minimizes the amount of non-vapor in the base (4) entrained by the stream. Preferably, baffles (not illustrated) are included in the base (4) to minimize the rotational flow of the non-vapor in the base (4), thereby assisting to minimize the entrainment of non-vapor in the base by the incoming stream. Baffles and features that have the same effects as baffles are well known to those of ordinary skill in the art.

According to the present invention, it is preferred that the entrainment of non-vapor in the base (4) by the incoming stream is minimized so as to contribute to the minimization the amount of non-vapor exiting with the vapor flow. These objectives of the invention are preferably accomplished by one or a combination of the following: locating the inlets (1) and (2), maintaining the level of non-vapor in the base (4), regulating the velocity of the incoming stream, distributing the non-uniform vapor velocities within the separation vessel (3), and regulating the velocity of the exiting vapor. Those of ordinary skill in the art will recognize that the location of the inlets (1) and (2), the level of non-vapor maintained in the base (4), the regulation of the velocity of the incoming stream, the distribution of the non-uniform vapor velocities within the separation vessel, and the regulation of the velocity of the exiting vapor, can each be subjected to a wide range of adjustments, and can each be adjusted independently of the others, so as to achieve the most preferable performance as dictated by the geometry of the separation vessel.

Figure 4:
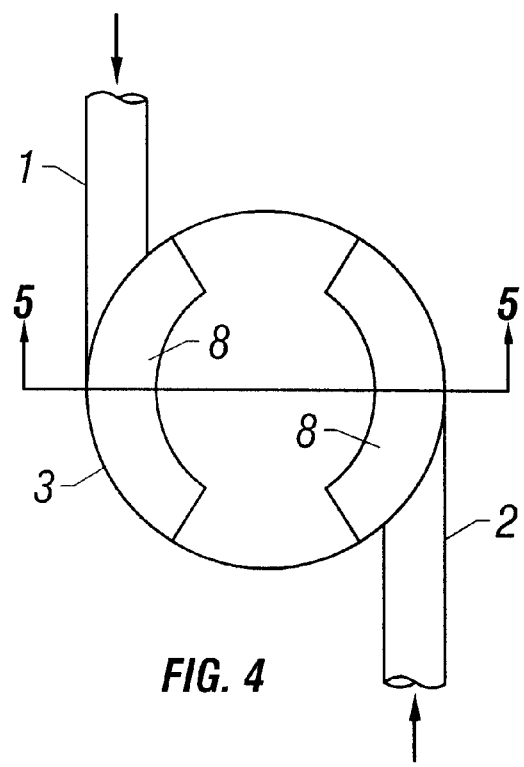
FIG. 4 is a top cross-sectional view of a separation vessel having two inlets and inlet guides.
Figure 5:
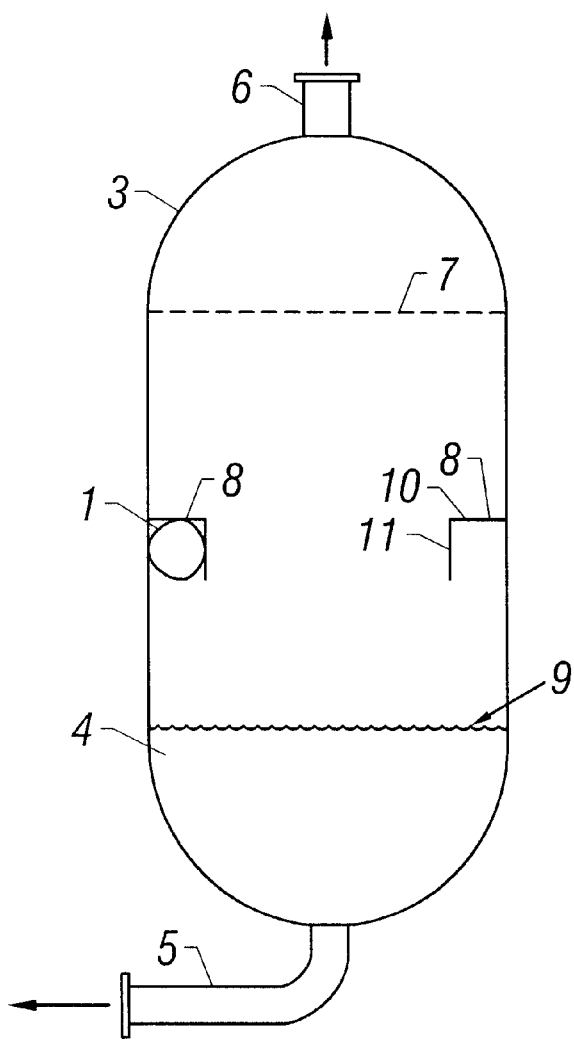
FIG. 5 is a side cross-sectional view, taken along line 5—5 of FIG. 4, of a separation vessel having two inlets and inlet guides.

According to another preferred embodiment, as illustrated in FIGS. 4 and 5, inlet guides (8), may be disposed within the separation vessel to maximize the tangential coherency of the stream. The inlet guide(s) (8) have a first ledge (10) extending perpendicular to the inner surface of the vessel (3) and a second ledge (11) extending perpendicular to the first ledge (10) and concentrically with respect to the inner surface of the vessel (3). As shown in FIG. 4, the inlet guides (8) may be arcuate and contoured along and to the inner surface of the separation vessel (3) so as to cover the point of entry of the inlet(s) (1) and (2). Preferably, the second ledge (11) extends for the entire length of the guide(s). The first ledge (10) of the guide(s) (8) preferably extends away from the inner surface of the separation vessel (3) for a distance that is approximately the same as the diameter of the inlet(s) (1) and/or (2). Preferably, the inlet guide(s) (8) circumscribe an arc of from about 60 to 120 degrees. Most preferably, the inlet guide(s) (8) circumscribe an arc of from about 90 to 120 degrees. Those of ordinary skill in the art will recognize that the geometry and configuration of the inlet guide(s) (8) can be varied as dictated by the design of the separation vessel.

Those of ordinary skill in the art will recognize that the extension of the guide(s) (8) outward into the separation vessel can be widely varied for the most preferable performance as dictated by the geometry of the separation vessel. Those of ordinary skill in the art will also recognize that the guide(s) (8) may not be arcuate and that the guide(s) (8) may be placed in a variety of positions, configurations, and angles, including a slight decline, as dictated by the geometry of the separation vessel (3), so as to achieve the maximum reduction in entrainment.

Since superficial velocities are responsible for entrainment once a specific droplet or particle size distribution is formed, a larger-diameter vapor outlet (6), which contributes to a reduction in the velocity of the exiting vapor, may also be used to reduce entrainment of non-vapor. The diameter of the vapor outlet affects the velocity of the exiting vapor. In terms of the design for any separation vessel, according to the preferred embodiments of the present invention, the disengagement of the inlet(s) and the vapor outlet is maximized. Those of ordinary skill in the art will recognize that the number of vapor outlet(s) used, their location, their diameter, and their geometric configuration can be adjusted and varied as dictated by the geometry of the separation vessel, and by the benefits from a cost-standpoint, the achieve the maximum reduction in entrainment.

In another preferred embodiment, the vapor outlet (6) is fed to a cyclone (not illustrated) well known to those of ordinary skill in the art. As is conventional in the art, the cyclone collects any liquids and solids entrained in the exiting vapor flow. The fluids or solids collected by the cyclone can be recirculated or stored, according to the particular refining or processing sequence in operation.

According to the present invention, the reduction of entrainment can be accomplished by one or more of the following methods: (1) reducing the velocity of the incoming stream by adjusting the number of inlet(s) used, the location of the inlet(s), and the diameter of the inlet(s); (2) maximizing the tangential coherency of the incoming stream by reducing its velocity and/or guiding it along a path when it is introduced to the separation vessel; (3) minimizing the tendency of the stream to move along the inner surface of the separation vessel toward the vapor outlet by reducing its velocity and/or by guiding it along a path when it is introduced to the separation vessel and/or by distributing vapor velocities within the separation vessel; and (4) reducing vapor flow exit velocities by adjusting the number of outlet(s), the location of the outlet(s), and the diameter of the outlet(s).

The present invention will now be described in more detail with reference to the following examples. The examples are merely illustrative of the methods of the present invention and are not intended to be limiting.

EXAMPLES

In gas/liquid processes, liquid entrainment in the form of sprays and mists are a result of droplet formation created by one or more of several mechanisms such as agitation, condensation, and pressure changes accompanied by flashing. In such processes, a major contributing factor to liquid entrainment is the drop size and distribution. Droplets created in high turbulence or velocity applications such as atomizers, quenching, flashing, and distillation, are usually a function of the energy or power per unit mass.

The size of the separation vessel depends on the processes and equipment being used, as well as the physical properties of the liquids, vapors, gases and solids being used. The following examples relate to the application of the process of the invention to a commercial flasher. A scaled-down model of a commercial flasher was fabricated to conduct the tests discussed in the examples. In a flasher like the subject commercial flasher, energy is supplied to the liquid by high-velocity flashing vapor. The scale-down of vapor rates by kinetic energy, and liquid rates by mass were estimated for the model flasher unit as follows.

For the gas phase, the kinetic energy scaling was expressed by the capacity factor definition used in distillation, which is closely related to the Souders-Brown correlation for demisters. The liquid phase scale-down was based on equivalent mass ratios between the commercial and the model unit. Drop size is dependent on physical properties of the system. For a gas/liquid system, the drop size is also dependent on power per unit mass in a turbulent flow regime. Entrainment is an exponential function of superficial velocity.

Because of the high rates of flow of the incoming stream generally used for operation in a separation vessel, the present invention sought a method by which to lower inlet velocities and distribute vapor velocities so that: (1) a tangential coherency of the inlet stream was created and maintained; (2) creepage of the inlet stream along the inner surface of the separation vessel toward the vapor outlet was reduced; (3) the amount of non-vapor from the incoming stream that exited with the vapor flow was reduced; and (4) the amount of non-vapor entrained by the incoming stream from the base of the separation vessel was minimized.

In the model flasher, a vapor distribution tray having 0.5 inch diameter holes and a hole area of 13.5% was used. The area adjacent to the wall of the vessel did not have holes to a distance of about 1.75 inch from the wall. The tray had 519 holes having a ½ inch diameter with a 1.1 inch triangular pitch.

A 14½ inch acrylic plastic cyclone was designed and piped to the outlet of the flasher in some test runs. The outlet of the cyclone was piped to a demister/vane arrangement contained in an acrylic plastic box. This setup facilitated observation of the effectiveness of the methods of the invention, as the bottom of the cyclone caught all of the measurable entrainment.

In some test runs, the tray was irrigated with 1.5 gallons per minute (gpm) of water. (noted in Table I as "1.5 gpm rinse.")

In some test runs, salt was used to simulate solids, such as catalysts, dissolved or suspended within the non-vapor in the incoming stream. (noted in Table I as "salt.")

When the flow was split into two inlet pipes, each had a 4¾ inch nominal diameter. When the inlets were enlarged, a 6 inch nominal diameter acrylic plastic pipe was used. (noted in Table I as "split inlet 6.")

When guides were tested, arcuate contoured guides between 60 and 120 degrees were used. (noted in Table I as "guides.")

The main observations from the runs made with the model separation vessel were:

When increasing gas rates on the incoming stream, the break point for increased entrainment seemed to be around 800 actual cubic feet per minute (acfm), for both cases of trayed and untrayed flasher, although the increase was exponential only when the tray was present, apparently because liquid wetted the bottom of the tray.

An irrigated tray reduced entrainment of salt (used to simulate dissolved solids such as catalysts) by about 80% when compared to the base case (no trays), although total liquid entrainment was not reduced, but rather increased.

Two inlets having a 4¾ inch nominal diameter significantly reduced entrainment. The addition of a non-irrigated distribution tray reduced the entrainment to about zero (up to a given gas rate).

With two inlets having a 4¾ inch nominal diameter and a tray, there was a sudden, dramatic increase in entrainment at about 1,260 acfm when the liquid rate was increased from about 52 to 60 gpm. It was observed that the tray appeared to flood at that point. It was further observed that addition of a rinse to the tray started the flooding at lower gas rates.

With two enlarged (6 inch nominal) inlets, no measurable entrainment could be seen up to, and including, the highest combination of liquid and gas rates in the range studied. With a tray present there also was no visible entrainment, and, additionally, there was less splashing present.

Flow guides over the inlet were effective in stopping entrainment at the higher rates. A 90° guide appeared to perform better than a 120° guide.

TABLE I

Model Unit Run Results
The number 1.5 when a tray is present refers to a rinse rate or irigation of about 1.5 gpm.
The 6 inch notation next to "inlet" refers to an enlarged inlet(s).
The "single" notation or a lack of notation next to "inlet" refers to a test vessel using only one inlet.

| Run No. | Gallons per minute (Gpm) | Actual cubic feet per minute (Acfm) | Entrainment lb/min | Comment |
|---|---|---|---|---|
| 1 | 52 | 765 | 0.001 | no trays |
| 2 | 35 | 784 | 0.002 | no trays |
| 3 | 35 | 557 | 0.001 | no trays |
| 4 | 35 | 896 | 0.010 | no trays |
| 5 | 35 | 387 | 0.000 | no trays |
| 6 | 59 | 857 | 0.006 | no trays |
| 7 | 52 | 830 | 0.001 | no trays - salt |
| 8 | 52 | 910 | 0.001 | no trays - salt |
| 9 | 52 | 928 | 0.064 | 1 tray |
| 10 | 52 | 690 | Greater than 0.000 | 1 tray |
| 11 | 52 | 917 | 0.283 | 1 tray |
| 12 | 52 | 985 | 0.425 | 1 tray |
| 13 | 52 | 870 | 0.170 | 1 tray - salt |
| 14 | 52 | 987 | 0.243 | 1 tray - salt |
| 15 | 52 | 987 | 0.447 | 1 tray - salt - 1.5 gpm rinse |
| 16 | 52 | 830 | 0.061 | 1 tray - salt - 1.5 gpm rinse |
| 17 | 52 | 618 | 0.002 | 1 tray - salt - 1.5 gpm rinse |
| 18 | 60 | 1080 | 0.000 | 1 tray - split inlet |
| 19 | 60 | 1118 | 2.124 | 1 tray - split inlet - 1.5 gpm rinse |
| 20 | 60 | 829 | 0.152 | 1 tray - split inlet - 1.5 gpm rinse |
| 21 | 60 | 924 | Greater than 0.000 | no trays - split inlet |
| 22 | 60 | 802 | Greater than 0.000 | no trays - split inlet |
| 23 | 60 | 1126 | 0.002 | no trays - split inlet |
| 24 | 60 | 886 | 0.013 | no trays |
| 25 | 60 | 777 | 0.003 | no trays |
| 26 | 60 | 998 | 0.017 | no trays |
| 27 | 60 | 1063 | 0.026 | no trays |
| 28 | 60 | 920 | 0.008 | no trays |
| 29 | 52 | 1087 | 0.022 | no trays |
| 30 | 52 | 980 | 0.000 | 1 tray - split inlet |
| 31 | 52 | 1192 | 0.000 | 1 tray - split inlet |
| 32 | 52 | 1295 | 0.000 | 1 tray - split inlet |
| 33 | 60 | 1267 | 3.398 | 1 tray - split inlet |
| 34 | 69 | 1212 | 0.000 | 1 tray - split inlet 6" |
| 35 | 76 | 1213 | 0.000 | 1 tray - split inlet 6" |
| 36 | 84 | 1260 | 0.000 | 1 tray - split inlet 6" |
| 37 | 76 | 1308 | 0.000 | 1 tray - split inlet 6" |
| 38 | 77 | 1398 | 0.000 | 1 tray - split inlet 6" |
| 39 | 84 | 1389 | 0.000 | 1 tray - split inlet 6" |
| 40 | 76 | 1390 | 0.000 | no trays - split inlet 6" |
| 41 | 84 | 1414 | 0.000 | no trays - split inlet 6" |
| 42 | 78 | 1204 | 0.000 | guides 90 - split inlet 6" |
| 43 | 79 | 1471 | 0.000 | guides 90 - split inlet 6" |
| 44 | 79 | 1466 | 0.000 | guides 90 - split inlet 6" |
| 45 | 81 | 1300 | 0.000 | guides 120 - split inlet 6" |
| 46 | 91 | 1440 | 0.000 | guides 120 - split inlet 6" |
| 47 | 84 | 1167 | 0.000 | wide outlet - split inlet 6" |
| 48 | 99 | 1165 | 0.000 | wide outlet - split inlet 6" |
| 49 | 98 | 1402 | 0.002 | wide outlet - split inlet 6" |
| 50 | 74 | 1076 | 0.018 | wide outlet - split inlet 6" |
| 51 | 69 | 1076 | 0.013 | wide outlet - single inlet 6" |
| 52 | 85 | 1071 | 0.021 | wide outlet - single inlet 6" |
| 53 | 74 | 1277 | 0.060 | wide outlet - single inlet 6" |
| 54 | 86 | 1253 | 0.168 | wide outlet - single inlet 6" |

It should be noted that although tests were run on a model separation vessel that provided for a tangential entry of the stream into the separation vessel, the method of the invention is also applicable to vessels where the actual entry of the stream into the vessel is not tangential. A tangential entry is not the focus or object of the invention, but rather an object is the maximization of tangential coherency once the stream has been introduced to the vessel.

Furthermore, although illustrative embodiments of the invention have been described, a wide range of modification, change, and substitution is intended in the disclosure herein, and in some instances, some features of the present invention may be employed without a corresponding use of the other features. Accordingly, it is appropriate that the appended claims be construed broadly and in a manner consistent with the scope of the invention.

What is claimed is:

1. A method for reducing entrainment of non-vapor components in a vapor flow exiting a separation vessel, said method comprising:

introducing a stream into a separation vessel having a curved first inner surface, a second inner surface perpendicular to said curved first inner surface for distributing vapor velocities within said separation vessel, at least one inlet, and at least one vapor outlet, wherein said stream is introduced through the at least one inlet and flows tangentially to the curved first inner surface, and wherein the stream comprises a non-vapor portion and a vapor portion, and wherein the velocity of the stream is reduced upon introduction of the stream to the separation vessel;

separating a vapor flow from the stream in the separation vessel, the vapor flow having a non-uniform velocity within the separation vessel;

permitting the vapor flow to exit from the separation vessel through the at least one vapor outlet;

maintaining the velocity of the stream through the at least one inlet at a rate whereby the stream flows tangentially along the curved first inner surface and whereby entrainment of the non-vapor portion of the stream by the vapor flow is minimized;

distributing the non-uniform vapor velocity within the separation vessel at a rate whereby the stream flows tangentially along the inner surface and whereby entrainment of the non-vapor portion of the stream by the vapor flow is minimized; and contacting the said second inner surface with a liquid flow.

2. The method of claim 1 wherein the non-vapor portion of the stream comprises at least one solid.

3. The method of claim 2 wherein the solid is dissolved or suspended in the non-vapor.

4. The method of claim 1 further comprising:
guiding the stream along a path when the stream is introduced through the at least one inlet to the separation vessel such that entrainment of the non-vapor portion of the stream by the vapor flow is minimized.

5. The method of claim 1 further comprising:
recovering any of the non-vapor portion of the stream that exits the separation vessel through the at least one vapor outlet with the vapor flow.

6. The method of claim 1 further comprising:
maintaining the velocity of the vapor flow through the vapor outlet at a rate whereby the stream flows tangentially along the inner surface and whereby entrainment of the non-vapor portion of the stream by the vapor flow is minimized.

7. A method for reducing entrainment of non-vapor components in a vapor flow exiting a separation vessel, said method comprising:

introducing a stream into a separation vessel having an inner surface, at least one inlet, and at least one vapor outlet, wherein the stream is introduced through the at least one inlet and flows tangentially to the inner surface of the separation vessel, wherein stream comprises a non-vapor portion and a vapor portion, and wherein the velocity of the stream is reduced upon introduction of the stream to the separation vessel;

separating a vapor flow from the stream in the separation vessel, said vapor flow having a non-uniform vapor velocity within the separation vessel;

permitting the vapor flow to exit from the separation vessel through the at least one vapor outlet; and guiding the stream introduced through the at least one inlet along a path when the stream is introduced in to the separation vessel and maintaining the velocity of the stream introduced through the at least one inlet at a rate whereby the stream flows tangentially along an inner surface and whereby entrainment of the non-vapor portion of the stream by the vapor flow is minimized.

8. The method of claim 7 wherein the non-vapor portion of the stream comprises at least one solid.

9. The method of claim 8 wherein the solid is dissolved or suspended in the non-vapor.

10. The method of claim 7 further comprising distributing the non-uniform vapor velocity within the separation vessel at a rate whereby the stream flows tangentially along the inner surface and whereby entrainment of the non-vapor portion of the stream by the vapor flow is minimized.

11. The method of claim 7 further comprising recovering any of the non-vapor portion of the stream that exits the separation vessel through the at least one vapor outlet with the vapor flow.

12. The method of claim 7 further comprising maintaining the velocity of the vapor flow through said vapor outlet at a rate whereby the stream flows tangentially along the inner surface and whereby entrainment of the non-vapor portion of the stream by the vapor flow is minimized.

13. A method for reducing entrainment of non-vapor components in a vapor flow exiting a separation vessel, said method comprising:

introducing a stream into a separation vessel having an inner surface, at least one inlet, and at least one vapor outlet, wherein said stream is introduced through the at least one inlet and flows tangentially to the inner surface, wherein the stream comprises a non-vapor portion and a vapor portion, and wherein the velocity of said stream is reduced upon introduction of the stream to the separation vessel;

separating a vapor flow from the stream in the separation vessel, the vapor flow having a non-uniform velocity within the separation vessel;

permitting the vapor flow to exit from the separation vessel through the at least one vapor outlet; and guiding the stream introduced through the at least one inlet along a path when the stream is introduced in to the separation vessel and maintaining the velocity of the vapor flow through the vapor outlet at a rate whereby the stream flows tangentially along the inner surface and whereby entrainment of the non-vapor portion of the stream by the vapor flow is minimized.

14. The method of claim 13 wherein the non-vapor portion of the stream comprises at least one solid.

15. The method of claim 14 wherein the solid is dissolved or suspended in the non-vapor.

16. The method of claim 13 further comprising distributing the non-uniform vapor velocity within the separation vessel at a rate whereby the stream flows tangentially along the inner surface and whereby entrainment of the non-vapor portion of the stream by the vapor flow is minimized.

17. The method of claim 13 further comprising recovering any of the non-vapor portion of the stream that exits the separation vessel through the at least one vapor outlet with the vapor flow.

18. A method for reducing entrainment of non-vapor components in a vapor flow exiting a separation vessel, said method comprising:
   introducing a stream into a separation vessel having an inner surface, at least one inlet, and at least one vapor outlet, wherein the stream is introduced through the at least one inlet, and wherein the stream comprises a non-vapor portion and a vapor portion, and wherein the velocity of the stream is reduced upon introduction of the stream to the separation vessel through the at least one inlet;
   minimizing movement of the stream along the inner surface of the separation vessel toward the vapor outlet;
   separating a vapor flow from the stream in the separation vessel, the vapor flow having a non-uniform velocity within the separation vessel;
   guiding the stream introduced through the at least one inlet along a path when the stream is introduced into the separation vessel and permitting the vapor flow to exit from the separation vessel through the at least one vapor outlet, such that entrainment of the non-vapor portion of the stream by the vapor flow is minimized.

19. The method of claim 18 wherein the non-vapor portion of the stream further comprises at least one solid.

20. The method of claim 19 wherein the solid is dissolved or suspended in the non-vapor.

21. The method of claim 18 further comprising distributing the non-uniform vapor velocity within the separation vessel at a rate whereby the stream flows tangentially along the inner surface and whereby entrainment of the non-vapor portion of the stream by the vapor flow is minimized.

22. The method of claim 18 further comprising recovering any of the non-vapor portion of the stream that exits the separation vessel through the at least one vapor outlet with the vapor flow.

23. The method of claim 18 further comprising maintaining the velocity of the vapor flow through said vapor outlet at a rate whereby the stream flows tangentially along the inner surface and whereby entrainment of the non-vapor portion of the stream by the vapor flow is minimized.

24. A method for reducing entrainment of non-vapor components in a vapor flow exiting a separation vessel, said method comprising:
   introducing a stream into a separation vessel having an inner surface, at least one inlet, and at least one vapor outlet, wherein the stream is introduced through the at least one inlet and flows tangentially to the inner surface, and wherein the stream comprises a non-vapor portion and a vapor portion, and wherein the velocity of the stream is reduced upon introduction of the stream to the separation vessel;
   separating a vapor flow from the stream in the separation vessel, the vapor flow having a non-unifonn velocity within the separation vessel;
   permitting the vapor flow to exit from the separation vessel through the at least one vapor outlet;
   guiding the stream introduced through the at least one inlet along a path when the stream is introduced in to the separation vessel and maintaining the velocity of the stream at a rate whereby the stream flows tangentially along the inner surface such that entrainment of the non-vapor portion of the stream by the vapor flow is minimized;
   maintaining a quantity of the non-vapor of the stream within the separation vessel whereby entrainment of the non-vapor portion of the stream by the stream is minimized.

25. The method of claim 24 wherein the non-vapor portion of the stream further comprises at least one solid.

26. The method of claim 25 wherein the solid is dissolved or suspended in the non-vapor.

27. The method of claim 24 further comprising distributing the non-uniform vapor velocity within the separation vessel at a rate whereby the stream flows tangentially along the inner surface and whereby entrainment of the non-vapor portion of the stream by the vapor flow is minimized.

28. The method of claim 24 further comprising recovering any of the non-vapor portion of the stream that exits the separation vessel through the at least one vapor outlet with the vapor flow.

29. The of method of claim 24 further comprising maintaining the velocity of the vapor flow through said vapor outlet at a rate whereby the stream flows tangentially along the inner surface and whereby entrainment of the non-vapor portion of the stream by the vapor flow is minimized.

30. A method for reducing entrainment of non-vapor components in a vapor flow exiting a separation vessel, said method comprising:
   introducing a stream into a separation vessel having an inner surface, at least two inlets, and at least one vapor outlet, wherein the stream is introduced through the at least two inlets and flows tangentially to the inner surface of the separation vessel, wherein stream comprises a non-vapor portion and a vapor portion, and wherein the velocity of the stream is reduced upon introduction of the stream to the separation vessel;
   separating a vapor flow from the stream in the separation vessel, said vapor flow having a non-uniform vapor velocity within the separation vessel;
   permitting the vapor flow to exit from the separation vessel through the at least one vapor outlet; and
   maintaining the velocity of the stream introduced through the at least two inlets at a rate whereby the stream flows tangentially along an inner surface and whereby entrainment of the non-vapor portion of the stream by the vapor flow is minimized.

31. The method of claim 30 wherein the separation vessel has a longitudinal axis and the stream is introduced into the separation vessel through two inlets located at different points along the longitudinal axis of the separation vessel.

32. A method for reducing entrainment of non-vapor components in a vapor flow exiting a separation vessel, said method comprising:
   introducing a stream into a separation vessel having an inner surface, at least two inlets, and at least one vapor outlet, wherein said stream is introduced through the at least two inlets and flows tangentially to the inner surface, wherein the stream comprises a non-vapor portion and a vapor portion, and wherein the velocity of said stream is reduced upon introduction of the stream to the separation vessel;
   separating a vapor flow from the stream in the separation vessel, the vapor flow having a non-uniform velocity within the separation vessel;
   permitting the vapor flow to exit from the separation vessel through the at least one vapor outlet; and
   maintaining the velocity of the vapor flow through the vapor outlet at a rate whereby the stream flows tangentially along the inner surface and whereby entrainment of the non-vapor portion of the stream by the vapor flow is minimized.

33. The method of claim 32 wherein the separation vessel has a longitudinal axis and the stream is introduced into the separation vessel through two inlets located at different points along the longitudinal axis of the separation vessel.

34. A method for reducing entrainment of non-vapor components in a vapor flow exiting a separation vessel, said method comprising:

introducing a stream into a separation vessel having a curved first inner surface, a second inner surface perpendicular to said curved first inner surface for distributing vapor velocities within said separation vessel, at least two inlets, and at least one vapor outlet, wherein said stream is introduced through the at least two inlets and flows tangentially to the curved first inner surface, and wherein the stream comprises a non-vapor portion and a vapor portion, and wherein the velocity of the stream is reduced upon introduction of the stream to the separation vessel;

separating a vapor flow from the stream in the separation vessel, the vapor flow having a non-uniform velocity within the separation vessel;

permitting the vapor flow to exit from the separation vessel through the at least one vapor outlet;

maintaining the velocity of the stream through the at least two inlets at a rate whereby the stream flows tangentially along the curved first inner surface and whereby entrainment of the non-vapor portion of the stream by the vapor flow is minimized;

distributing the non-uniform vapor velocity within the separation vessel at a rate whereby the stream flows tangentially along the inner surface and whereby entrainment of the non-vapor portion of the stream by the vapor flow is minimized; and contacting the said second inner surface with a liquid flow.

35. The method of claim 34 wherein the separation vessel has a longitudinal axis and the stream is introduced into the separation vessel through two inlets located at different points along the longitudinal axis of the separation vessel.

36. A method for reducing entrainment of non-vapor components in a vapor flow exiting a separation vessel, said method comprising:

introducing a stream into a separation vessel having an inner surface, at least two inlets, and at least one vapor outlet, wherein the stream is introduced through at the least two inlets, and wherein the stream comprises a non-vapor portion and a vapor portion, and wherein the velocity of the stream is reduced upon introduction of the stream to the separation vessel through the at least two inlets;

minimizing movement of the stream along the inner surface of the separation vessel toward the vapor outlet;

separating a vapor flow from the stream in the separation vessel, the vapor flow having a non-uniform velocity within the separation vessel; and permitting the vapor flow to exit from the separation vessel through the at least one vapor outlet;

whereby entrainment of the non-vapor portion of the stream by the vapor flow is minimized.

37. The method of claim 36 wherein the separation vessel has a longitudinal axis and the stream is introduced into the separation vessel through two inlets located at different points along the longitudinal axis of the separation vessel.

38. A method for reducing entrainment of non-vapor components in a vapor flow exiting a separation vessel, said method comprising:

introducing a stream into a separation vessel having an inner surface, at least two inlets, and at least one vapor outlet, wherein the stream is introduced through the at least two inlets and flows tangentially to the inner surface, and wherein the stream comprises a non-vapor portion and a vapor portion, and wherein the velocity of the stream is reduced upon introduction of the stream to the separation vessel;

separating a vapor flow from the stream in the separation vessel, the vapor flow having a non-uniform velocity within the separation vessel;

permitting the vapor flow to exit from the separation vessel through the at least one vapor outlet;

maintaining the velocity of the stream at a rate whereby the stream flows tangentially along the inner surface and whereby entrainment of the non-vapor portion of the stream by the vapor flow is minimized;

maintaining a quantity of the non-vapor of the stream within the separation vessel whereby entrainment of the non-vapor portion of the stream by the stream is minimized.

39. The method of claim 38 wherein the separation vessel has a longitudinal axis and the stream is introduced into the separation vessel through two inlets located at different points along the longitudinal axis of the separation vessel.

* * * * *